United States Patent
Givens et al.

(10) Patent No.: US 9,469,162 B1
(45) Date of Patent: Oct. 18, 2016

(54) TIRE CONSTRUCTION HAVING A CONTINUOUS BODY PLY TURN UP STRUCTURE

(71) Applicant: Bridgestone Americas Tire Operations, LLC, Nashville, TN (US)

(72) Inventors: Samuel O. Givens, Copley, OH (US); Hans R. Dorfi, Akron, OH (US); Dennis W. Snyder, Uniontown, OH (US); Anoop G. Varghese, Fairlawn, OH (US); Benjamin R. Rethmel, Doylestown, OH (US); Brian D. Steenwyk, Uniontown, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 15/038,088

(22) PCT Filed: Nov. 20, 2014

(86) PCT No.: PCT/US2014/066576
§ 371 (c)(1),
(2) Date: May 20, 2016

(87) PCT Pub. No.: WO2015/080935
PCT Pub. Date: Jun. 4, 2015

Related U.S. Application Data

(60) Provisional application No. 61/909,397, filed on Nov. 27, 2013.

(51) Int. Cl.
*B60C 15/00* (2006.01)
*B60C 15/04* (2006.01)
*B60C 13/00* (2006.01)
*B60C 11/00* (2006.01)
(Continued)

(52) U.S. Cl.
CPC .............. *B60C 13/009* (2013.04); *B60C 9/04* (2013.01); *B60C 11/00* (2013.01); *B60C 15/0009* (2013.04); *B60C 15/05* (2013.01); *B60C 15/0036* (2013.04); *B60C 2013/007* (2013.04)

(58) Field of Classification Search
CPC . B60C 15/00; B60C 15/009; B60C 15/0036; B60C 15/04; B60C 15/05
See application file for complete search history.

(56) References Cited

U.S. PATENT DOCUMENTS

| 1,877,360 A | 9/1932 | Alvin |
| 2,493,614 A | 1/1950 | Bourdon |
| 2,501,644 A | 3/1950 | Kraft et al. |

(Continued)

FOREIGN PATENT DOCUMENTS

| DE | 1286745 | 1/1969 |
| DE | 4131083 A1 | 4/1992 |

(Continued)

OTHER PUBLICATIONS

International Search Report and Written Opinion in corresponding International Application No. PCT/US2014/066576 dated Feb. 26, 2015, 4 pages.

(Continued)

*Primary Examiner* — Justin Fischer

(57) ABSTRACT

A pneumatic tire construction is provided using one or more folded body ply sheets constructed such that upon formation of the tire, the turn-ups in the sidewalls are looped turn-ups such that there are no free turn-up ends in the sidewalls.

30 Claims, 12 Drawing Sheets

(51) Int. Cl.
*B60C 9/04* (2006.01)
*B60C 15/05* (2006.01)

(56) References Cited

U.S. PATENT DOCUMENTS

| | | | |
|---|---|---|---|
| 3,286,758 A | 11/1966 | Jonas et al. | |
| 3,554,261 A | 1/1971 | Mirtain et al. | |
| 3,625,271 A | 12/1971 | Hutch | |
| 4,023,608 A | 5/1977 | Meiss | |
| 4,630,662 A | 12/1986 | Howind | |
| 4,688,617 A | 8/1987 | Hopkins et al. | |
| 4,830,781 A | 5/1989 | Oswald | |
| 5,127,978 A | 7/1992 | Holroyd et al. | |
| 5,437,321 A | 8/1995 | Breny | |
| 5,795,416 A | 8/1998 | Willard, Jr. et al. | |
| 5,820,710 A | 10/1998 | Behnsen et al. | |
| 6,260,598 B1 | 7/2001 | Tanaka | |
| 8,365,787 B2 | 2/2013 | Matsuda et al. | |
| 8,590,587 B2 | 11/2013 | Fujita | |
| 2008/0277037 A1 | 11/2008 | Yano | |
| 2010/0024960 A1 | 2/2010 | Jin et al. | |
| 2010/0186876 A1 | 7/2010 | Nakata | |
| 2010/0319831 A1 | 12/2010 | Miyazono | |
| 2011/0186201 A1 | 8/2011 | Buxton et al. | |
| 2011/0277902 A1 | 11/2011 | Muelhause et al. | |
| 2013/0025763 A1 | 1/2013 | Endo et al. | |
| 2013/0105057 A1 | 5/2013 | Lam | |
| 2013/0312886 A1 | 11/2013 | Ohno | |
| 2014/0048192 A1 | 2/2014 | Mabuchi et al. | |
| 2014/0090763 A1 | 4/2014 | Sugimoto | |

FOREIGN PATENT DOCUMENTS

| | | | |
|---|---|---|---|
| DE | 0847879 A1 | | 6/1998 |
| DE | 102013107473 A1 | | 1/2013 |
| EP | 0066225 A2 | | 12/1982 |
| GB | 1590193 | * | 5/1981 |
| GB | 1590193 A | | 5/1981 |
| JP | 53087405 A2 | | 8/1978 |
| JP | 61039603 U1 | | 3/1986 |
| JP | 2008265683 A | | 11/2008 |
| JP | 2013507271 A | | 3/2013 |
| JP | 2014108683 A2 | | 6/2014 |
| JP | 2014108684 A2 | | 6/2014 |

OTHER PUBLICATIONS

The tire construction shown in Figs. 1A-1E and described in paragraphs [0002]-[40004] of the application is admitted to prior art.

* cited by examiner

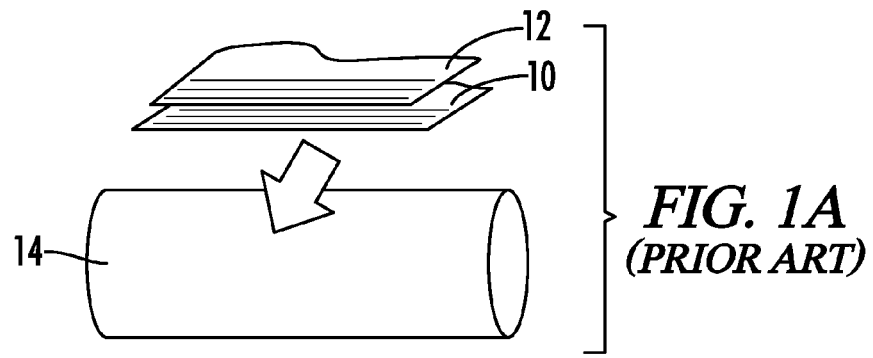
*FIG. 1A*
*(PRIOR ART)*
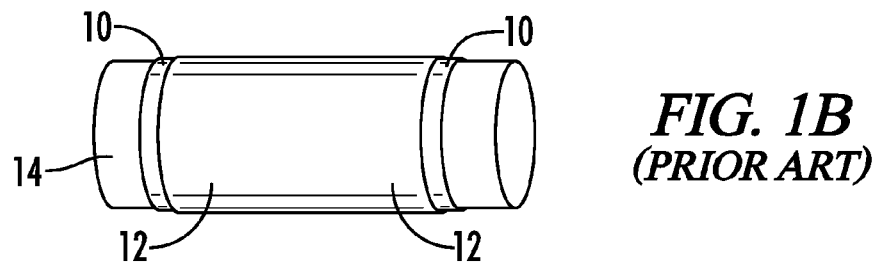
*FIG. 1B*
*(PRIOR ART)*
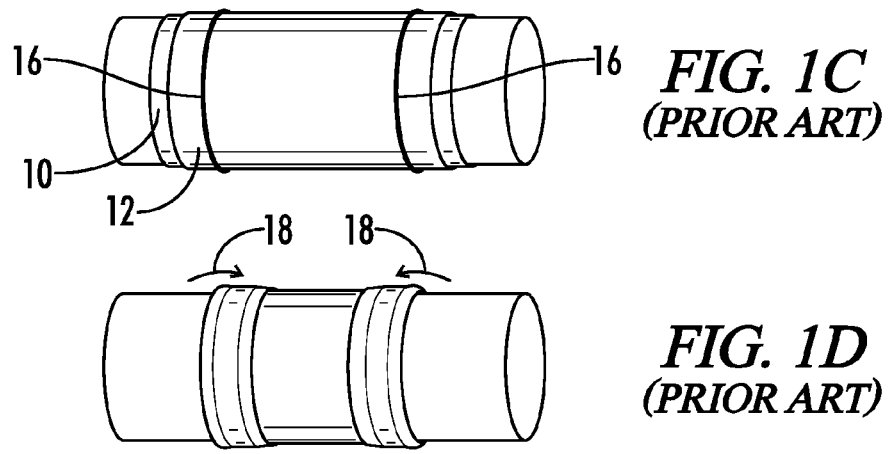
*FIG. 1C*
*(PRIOR ART)*
*FIG. 1D*
*(PRIOR ART)*
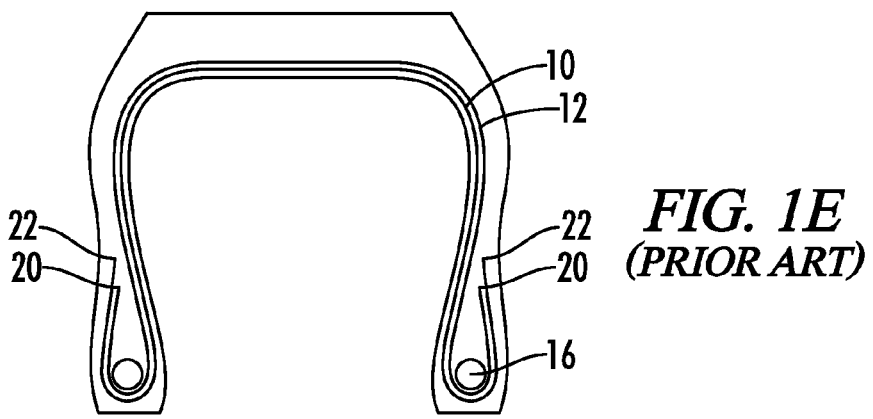
*FIG. 1E*
*(PRIOR ART)*

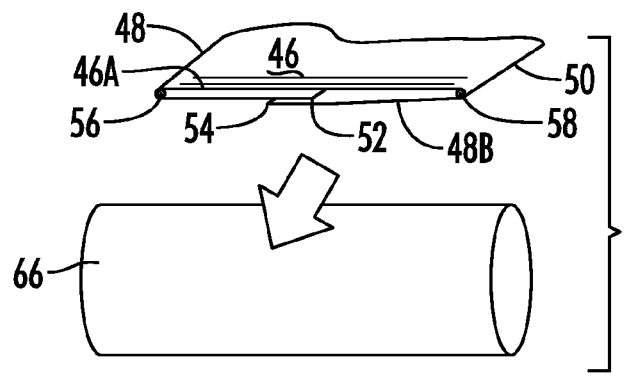
FIG. 2A
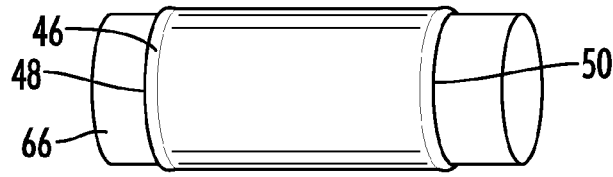
FIG. 2B
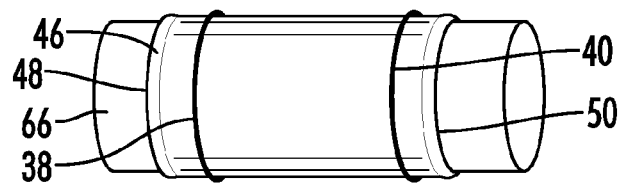
FIG. 2C
FIG. 2D
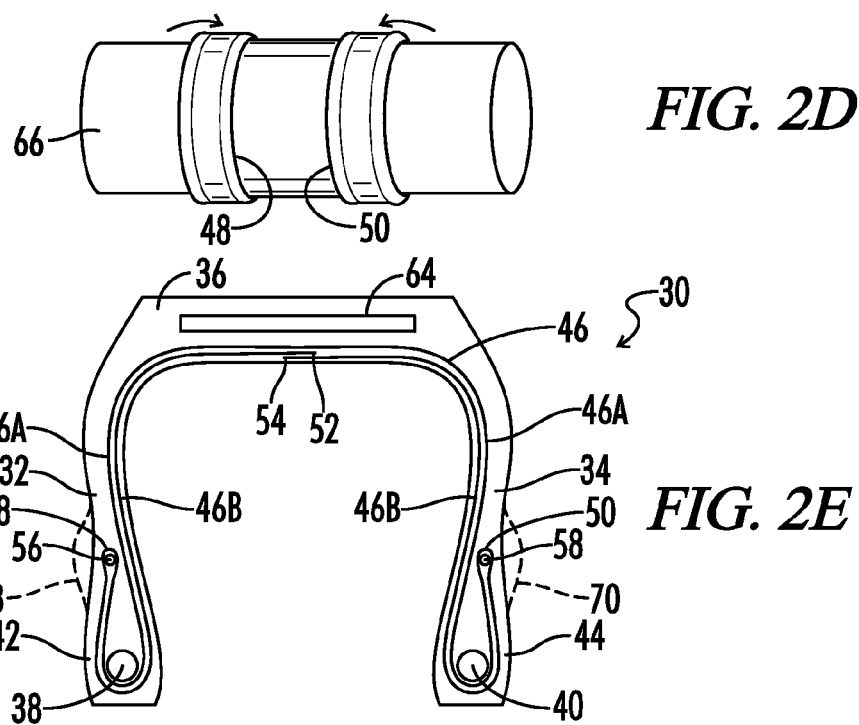
FIG. 2E

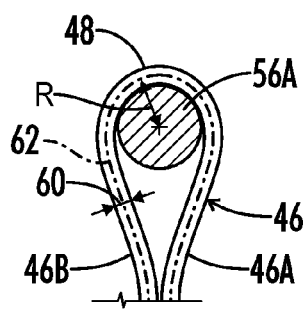
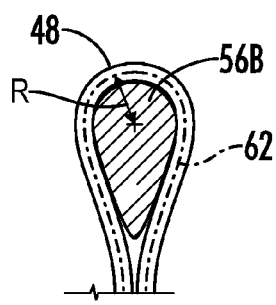
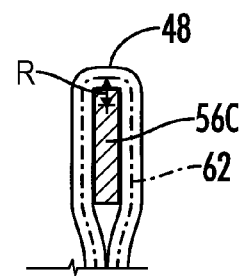
FIG. 3            FIG. 4            FIG. 5
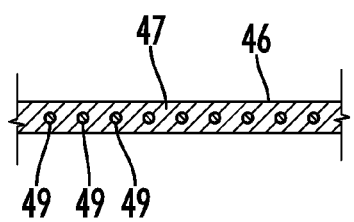
FIG. 5A

TIRE CONSTRUCTION HAVING A CONTINUOUS BODY PLY TURN UP STRUCTURE

BACKGROUND OF THE INVENTION

1. Field of the Invention

The present invention relates generally to the construction of pneumatic tires, and more particularly, but not by way of limitation, to improved constructions for the turn-up endings of the body plies in the sidewall region of a tire.

2. Description of the Prior Art

A typical prior art tire construction for a tire having two body plies in each sidewall is illustrated in FIGS. 1A-1E. In FIG. 1A, first and second body ply sheets 10 and 12 are being placed on a tire building drum 14. The first sheet 10 is shown as being wider than the second sheet 12. In FIG. 1B the first and second sheets 10 and 12 are in place around the tire building drum 14. In FIG. 1C tire bead rings 16 have been placed around the tire building drum. In FIG. 1D the axially outer portions of the body ply sheets have been folded over the bead rings as indicated by arrows 18.

FIG. 1E is a schematic cross-section view of a typical prior art tire construction utilizing the tire carcass constructed in accordance with FIGS. 1A-1D. In each sidewall of the tire the body ply sheets 10 and 12 terminate in free turn-up ends 20 and 22, respectively.

Tire constructions such as that shown in FIGS. 1A-1E are commonly designed with radial or bias body plies that have such free turn-up ends, which may also be referred to as discontinuous body ply endings, in the sidewall region. The free turn-up ends can provide an origination point for cracking in the adjacent rubber matrix, especially during severe operating conditions such as under inflation and/or overloading of the tire. This under inflation or overloading can lead to extreme flexion of the tire in the sidewall area, and that flexion can ultimately lead to fatigue type conditions originating adjacent the free turn-up ends.

This is particularly a concern in agricultural tires which are designed for operation at relatively low pressures in order to increase the footprint of the tires to reduce soil compaction. Such agricultural tires designed for low pressure operation and heavy loads are at increased risk for sidewall conditions of the type described.

Accordingly, there is a continuing need for the enhancement of tire designs to provide robust constructions that can withstand the expected conditions of high flexion due to low pressure and high load operation.

SUMMARY OF THE INVENTION

A pneumatic tire is disclosed having first and second sidewalls, a circumferential tread area extending between the sidewalls, and first and second beads located in a bead portion of each of the first and second sidewalls, respectively. A folded body ply sheet extends down through each sidewall such that the folded body ply sheet forms two body plies in each sidewall. The folded body ply sheet then extends around each of the beads, and then back upward into each sidewall to form first and second looped turn-ups in the first and second sidewalls, respectively, such that there are no free turn-up ends of the folded body ply sheet in the sidewalls. First and second inserts may be received in the looped turn-ups in the first and second sidewalls, respectively, such that a minimum loop radius greater than one half of a thickness of one layer of the body ply sheet is maintained.

In another aspect of the invention a pneumatic tire is disclosed having first and second sidewalls including first and second sidewall bead portions, respectively. A circumferential tread area extends between the sidewalls. A lower folded body ply sheet extends across the tread area, down through each sidewall, then turning upward in each of the bead portions, then extending upward into each sidewall, such that the lower folded body ply sheet forms two axially inner body plies in each sidewall, and such that the lower folded body ply sheet forms a looped turn-up in each sidewall. An upper folded body ply sheet extends across the tread area, down through each sidewall, then turns upward in each of the bead portions, then extends upward into each sidewall, such that the upper folded body ply sheet forms two axially outer body plies in each sidewall, and such that the upper folded body ply sheet forms another looped turn-up in each sidewall.

In any of the above embodiments each layer of the folded body ply sheet may be constructed of a body ply skim material having reinforcing cords embedded in the skim material, and the inserts may be formed of the same material as the body ply skim material.

In any of the above embodiments the inserts may be at least partially cured prior to placement in the turn-up loops.

In any of the above embodiments the inserts may be formed of an elastomeric material different from the skim material.

In any of the above embodiments the inserts may have a circular cross-section.

In any of the above embodiments the inserts may have a tapered cross-section.

In any of the above embodiments the minimum loop radius may be greater than or equal to the thickness of one layer of the folded body ply sheet.

In any of the above embodiments each of the sidewalls may be formed with an increased sidewall thickness adjacent the looped turn-ups, as compared to the sidewall thickness above and below the looped turn-ups.

In any of the above embodiments the axially outer looped turn-ups may extend to a higher turn-up height than the axially inner looped turn-ups. This arrangement may be provided by using a lower or radially inner folded body ply sheet having a width greater than a width of the upper or radially outer folded body ply sheet prior to application of the folded body ply sheets to the tires.

In any of the above embodiments, in the first sidewall the axially outer looped turn-up may extend to a higher turn-up height than the axially inner looped turn-up, and in the second sidewall the axially outer looped turn-up may extend to a lower turn-up height than the axially inner looped turn-up. This arrangement can be provided by utilizing upper and lower folded body ply sheets of equal width prior to application to the tire.

In any of the above embodiments a belt package may be utilized including a plurality of polyester or steel belts surrounding the folded body ply sheet or sheets in the circumferential tread area.

In any of the above embodiments, more than two folded body ply sheets may be used to provide six or more body plies in each sidewall.

In any of the above embodiments using multiple folded body ply sheets, multiple beads may be located in each sidewall bead portion and different folded body ply sheets may extend around different beads in each sidewall bead portion.

In any of the above embodiments, folded body ply sheets may be mixed with single layer non-folded body ply sheets.

Numerous objects, features and advantages of the present invention will be readily apparent to those skilled in the art upon a reading of the following disclosure when taken in conjunction with the accompanying drawings.

BRIEF DESCRIPTION OF THE DRAWINGS

FIGS. 1A-1E comprise a sequential series of schematic figures illustrating a typical prior art construction of a tire having two body plies in each sidewall with free turn-up ends terminating in the sidewall portion of the tire.

FIG. 1A illustrates two separate sheets of body ply material being applied to a tire building drum.

FIG. 1B shows the two sheets in place on the tire building drum.

FIG. 1C shows the addition of the bead rings on the drum.

FIG. 1D shows the body ply material having been folded over the bead rings.

FIG. 1E is a schematic cross-sectional view of a prior art tire utilizing the carcass constructed in FIGS. 1A-1D. The tire construction in FIG. 1E illustrates the free or discontinuous turn-up ends in the sidewall portion of the tire.

FIGS. 2A-2E comprise a sequential series of figures illustrating the methods of construction of one embodiment of the present invention wherein a folded body ply sheet is utilized to form a tire construction having looped turn-ups in the sidewall such that there are no free turn-up ends of the folded body ply sheet in the sidewall.

FIG. 2A shows a folded body ply sheet being applied to a tire building drum.

FIG. 2B shows the folded body ply sheet in place on the tire building drum.

FIG. 2C shows the addition of bead rings.

FIG. 2D shows the folded body ply sheet having been folded over the bead rings on the tire building drum.

FIG. 2E is a schematic cross-sectional view of a tire utilizing the carcass constructed via the methods of FIGS. 2A-2D, wherein the tire construction provides first and second looped turn-ups in the first and second sidewalls, such that there are no free turn-up ends of the folded body ply sheets in the sidewalls.

FIG. 3 schematically illustrates a first embodiment of an insert received in the looped turn-ups.

FIG. 4 schematically illustrates a second embodiment of an insert received in the looped turn-ups.

FIG. 5 illustrates a third embodiment of an insert for the looped turn-ups.

FIG. 5A is a schematic cross-section of the body ply sheet material from which the folded body ply sheet is constructed.

FIG. 6A shows the two folded body ply sheets being applied to the tire building drum.

FIG. 6B shows the two sheets in place on the tire building drum and illustrates the one sheet being wider than the other sheet.

FIG. 6C shows the bead rings being applied to the drum.

FIG. 6D shows the two folded body ply sheets having been folded over the bead rings.

FIG. 6E is a schematic cross-section view of a tire built with the carcass formed from the two folded body ply sheets, such that there are four body plies in each sidewall and there are two looped turn-ups in each sidewall. In each sidewall the axially outer looped turn-up extends to a greater turn-up height than does the axially inner looped turn-up.

FIG. 7A shows the two equal width sheets being applied to the drum in a staggered relationship.

FIG. 7B shows the sheets in place on the drum and staggered in their lengthwise positioning on the drum.

FIG. 7C shows the bead rings being applied to the drum.

FIG. 7D shows the two folded body ply sheets having been folded over the bead rings.

FIG. 7E is a schematic cross-section view of a tire constructed using the tire carcass resulting from FIGS. 7A-7D. In this case in one sidewall the axially outer looped turn-up extends to a greater turn-up height than does the axially inner looped turn-up, and in the other sidewall the axially outer looped turn-up extends to a lesser turn-up height than does the axially inner looped turn-up.

DETAILED DESCRIPTION

Figure 6A:
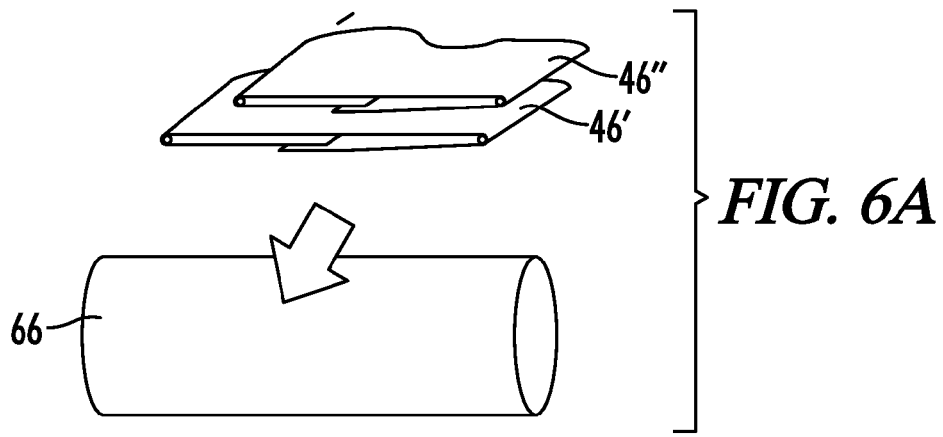
FIGS. 6A-6E comprise a sequential series of schematic drawings illustrating the methods of construction of a second embodiment of the present invention wherein two folded body ply sheets, which may be referred to as upper and lower folded body ply sheets, are applied to the tire building drum.

Following are definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to directions which are parallel to the axis of rotation of a tire.

"Bead" or "bead core" refers to that part of a tire comprising an annular tensile member, the bead core, wrapped by ply cords and shaped, with or without other reinforcement elements to fit a designed tire rim.

"Belt" or "belt ply" refers to an annular layer or ply of parallel cords, woven or unwoven, underlying the tread, not anchored to the bead.

"Carcass" refers to the tire structure apart from the belt structure, tread, undertread, and sidewall rubber but including the beads, (carcass plies are wrapped around the beads).

"Circumferential" refers to lines or directions extending along the perimeter of the surface of the annular tread perpendicular to the axial direction.

"Cord" means one of the reinforcement strands of which the plies in the tire are comprised.

"Equatorial plane (EP)" refers to a plane that is perpendicular to the axis of rotation of a tire and passes through the center of the tire's tread.

"Ply" means a continuous layer of rubber coated parallel cords.

"Radial" and "radially" refer to directions that are perpendicular to the axis of rotation of a tire.

"Radial-ply" or "radial-ply tire" refers to a belted or circumferentially-restricted pneumatic tire in which the ply cords which extend from bead to bead are laid at cord angles between 65 degree and 90 degree with respect to the equatorial plane of the tire.

"Turn-up height" (TH) means the radial distance from the base of the bead core to the upper end of the turn-up.

Directions are also stated in this application with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" are used in connection with an element, the "upper" element is spaced closer to the tread than the "lower" element. Additionally, when relative directional terms such as "above" or "below" are used in connection with an element, an element that is "above" another element is closer to the tread than the other element. Additionally, the term "radially inner" refers to an element that is closer to the axis of rotation than is a "radially outer" element. The terms "axially inward" and "axially inwardly" refer to a general direction towards the equatorial plane of the tire, whereas "axially outward" and "axially outwardly" refer to a general direction away from the equatorial plane of the tire and towards the sidewall of the tire.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

Embodiment of FIGS. 2A-2E

Referring now to FIG. 2E, a schematic cross-section view is there shown of a pneumatic tire 30. The tire 30 has first and second sidewalls 32 and 34. A circumferential tread area 36 extends between the sidewalls. First and second beads 38 and 40 are located in bead portions 42 and 44 of the first and second sidewalls 32 and 34, respectively.

A folded body ply sheet 46 includes two substantially co-extensive layers 46A and 46B. The folded body ply sheet 46 extends across the tread area 36, down through each sidewall 32 and 34, around each of the beads 38 and 40, then back upward into each sidewall. The two layers 46A and 46B of the folded body ply sheet form two body plies in each sidewall. The folded edges of the folded body ply sheet form first and second looped turn-ups 48 and 50 in the first and second sidewalls 32 and 34, respectively. There are no free turn-up ends in the sidewalls.

Figure 11A:
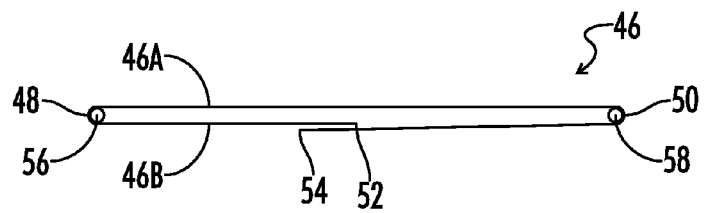
FIG. 11A is a schematic cross-section view of a first embodiment of a folded body ply sheet.

A schematic drawing of the folded body ply sheet 46 corresponding to FIGS. 2A-2E is shown in FIG. 11A. In the embodiment of FIG. 11A and FIGS. 2A-2E, two free ends 52 and 54 of the folded body ply sheet 46 are shown overlapping with each other in the tread area 36 of the tire.

Figure 11B:
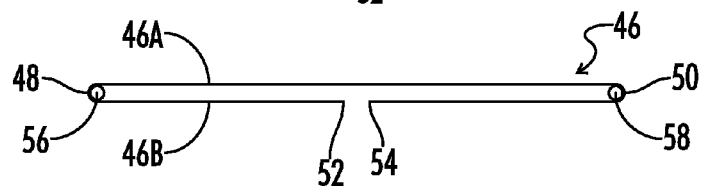
FIG. 11B is a schematic cross-section view of a second embodiment of a folded body ply sheet.

FIG. 11B schematically illustrates a second embodiment wherein the two free ends 52 and 54 are spaced from each other so that there is a gap therebetween.

Figure 11C:
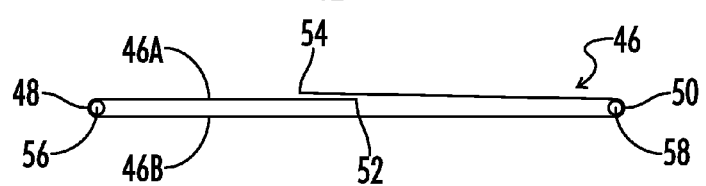
FIG. 11C is a schematic cross-section illustration of a third embodiment of a folded body ply sheet.
Figure 11D:
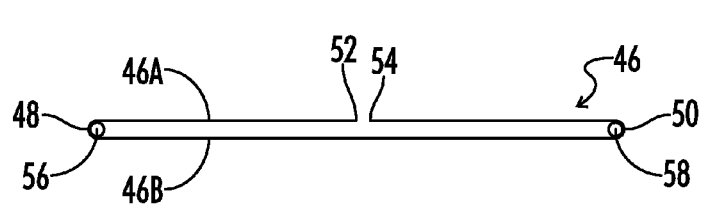
FIG. 11D is a schematic cross-section view of a fourth embodiment of a folded body ply sheet.

Also, in the embodiment shown in FIG. 11A and FIGS. 2A-2E the free ends 52 and 54 are located in the lower layer 46B below the continuous upper layer 46A of the folded body ply sheet in the tread area. It is also possible as schematically illustrated in FIG. 11C to reverse the orientation of the folded body ply sheet such that the free ends 52 and 54 lie in the upper layer of the folded body ply sheet in the tread area. In FIG. 11C the free ends 52 and 54 are shown as overlapping. In FIG. 11D the free ends 52 and 54 are spaced apart. Any of the embodiments of FIGS. 11A-11D may be utilized as the folded body ply sheet 46 in the embodiment described regarding FIGS. 2A-2E.

Referring again to FIG. 2E, first and second inserts 56 and 58 are received in the looped turn-ups in the first and second sidewalls 32 and 34, respectively. Several possible designs for the inserts are shown in FIGS. 3, 4 and 5. FIGS. 3-5 each illustrate only the first looped turn-up 48 and its insert 56, it being understood that the other looped turn-up 50 and insert 58 are identically constructed.

FIG. 3 shows an insert 56A having a circular cross-section. FIG. 4 shows an insert 56B having a tapered cross-section. FIG. 5 shows an insert 56C which is generally rectangular in shape.

One purpose of the inserts 56 and 58 is to maintain a minimum loop radius R for the looped turn-up 48. This is to reduce kinking or buckling of the cords. Preferably the loop radius R is maintained at a minimum of greater than one half of a thickness 60 of one layer 46A or 46B of the folded body ply sheet 46. More preferably the minimum loop radius is greater than or equal to the thickness 60 of one layer of the folded body ply sheet 46. It is noted that the loop radius R is measured to a center line or center plane 62 of the one layer of the folded body ply sheet 46.

FIG. 5A shows a schematic cross-section of one layer 46A or 46B of the folded body ply sheet. The folded body ply sheet 46 is constructed of conventional rubber body ply sheet material which includes a body ply skim material 47 having reinforcing cords 49 embedded in the skim material. The reinforcing cords 49 may be of any suitable material, including polyester, nylon, rayon, steel and Aramid. The reinforcing cords 49 may be oriented in a radial or a biased orientation. In one embodiment of the inserts 56, the inserts 56 may be formed from the same material as the body ply skim material 47. When the inserts 56 are formed from the body ply skim material which is a rubber material, the inserts are preferably at least partially cured prior to placement within the looped turn-ups. This pre-curing of the material of the inserts provides additional structural rigidity to the inserts so as to reduce deformation of the insert during the process of forming and curing the tire 30.

Alternatively, the inserts 56 may be formed of an elastomeric material different from the skim material. This other material could be any other material of the type commonly used in tire construction, including for example bead filler material, sidewall rubber material or tread rubber material. Inserts made from these other elastomeric materials may also be at least partially cured prior to placement in the looped turn-ups.

One or more circumferentially extending reinforcing belts, which may be generally referred to as a belt package 64, are placed in the tread area 36 radially outside of the folded body ply sheet 46.

FIGS. 2A-2D schematically illustrate certain steps in the construction of the tire carcass of the tire 30.

Figure 12:
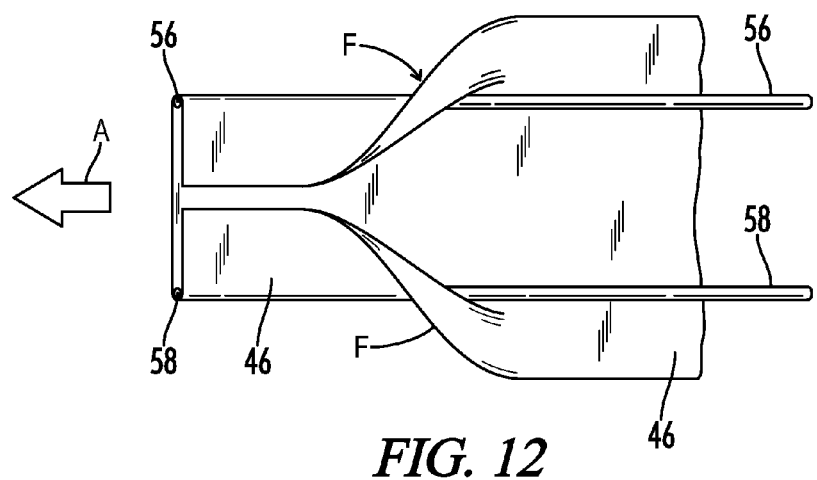
FIG. 12 is a schematic illustration of the manner of construction of a folded body ply sheet.

FIG. 2A illustrates the folded body ply sheet 46 being placed upon a tire building drum 66. It is noted that the folded body ply sheet 46 has been pre-formed and already has the inserts 56 and 58 in place within the portions of the folded body ply sheet 46 that will become the looped turn-ups 48 and 50. FIG. 12 schematically illustrates the pre-formation of the folded body ply sheet 46 wherein continuous strands of insert material 56 and 58 are laid onto an unfolded sheet 46, which is then folded as indicated at areas F as the continuous sheet moves in the direction indicated by arrow A. The pre-formed folded body ply sheet material is then rolled up for use in the process of FIGS. 2A-2E.

FIG. 2B represents the folded body ply sheet 46 having been placed upon the drum 66.

In FIG. 2C, the bead rings 38 and 40 have been placed on the drum around the folded body ply sheet.

In FIG. 2D the body ply sheet has been folded over the bead portions 38 and 40. Subsequent to the condition of FIG. 2D, the folded body ply sheet is removed from the drum 66 and formed in a known manner into a carcass having the general shape seen in FIG. 2E, after which it is placed in a tire mold (not shown) and the rubber portions of the tire 30 molded thereabout to result in the tire 30 as seen in FIG. 2E.

As is indicated in dashed lines in FIG. 2E each of the sidewalls 32 and 34 may be formed with zones 68 and 70, respectively, of increased sidewall thickness adjacent the looped turn-ups 48 and 50, respectively. The sidewall thickness in the zones 68 and 70 is increased as compared to the sidewall thickness of the walls 32 and 34 above and below the location of the looped turn-ups.

Figure 9:
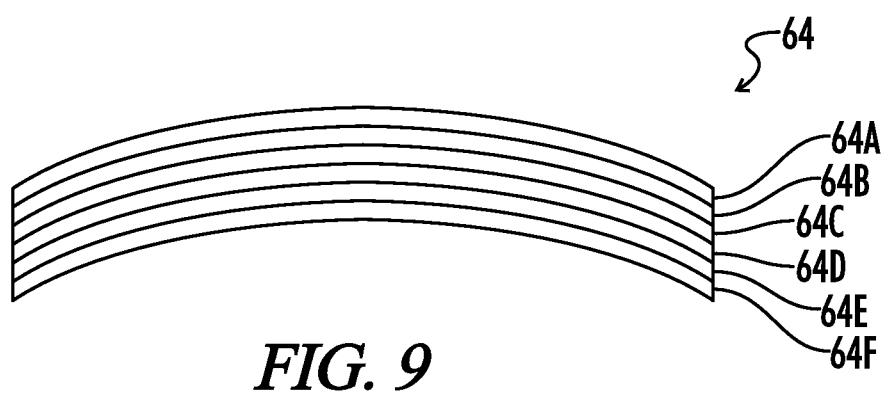
FIG. 9 is a schematic illustration of a belt package which may be used with any of the embodiments shown, wherein six polyester belts are provided.
Figure 10:
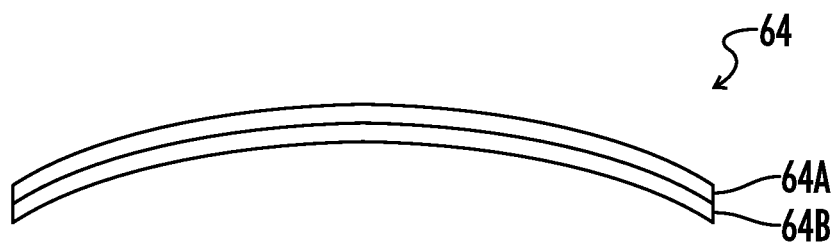
FIG. 10 is a schematic illustration of an alternative belt package which may be used with any of the above embodiments, which provides two steel belts.

FIGS. 9 and 10 illustrate two possible embodiments of the belt package 64. In the embodiment of FIG. 9 the belt package 64 includes six polyester belts 64A-64F. In the embodiment of FIG. 10, the belt package 64 includes two steel belts 64A and 64B. Other belt packages having any desired number of belts of any desired material construction could also be used.

The Embodiment of FIGS. 6A-6E

Referring now to FIGS. 6A-6E, an alternative embodiment is there shown which uses two folded body ply sheets such that four body plies are provided in each sidewall. There are correspondingly two looped turn-ups located in each of the sidewalls. In the embodiment of FIGS. 6A-6E, the two folded body ply sheets are of different widths.

Turning now to FIG. 6A, a wider lower or radially inner folded body ply sheet 46', and a narrower upper or radially outer folded body ply sheet 46" are shown advancing toward the tire building drum 66. The lower and upper folded body ply sheets 46' and 46" are shown in FIG. 6A as being of the embodiment generally shown in FIG. 11A. It will be understood that any of the folded body ply sheet arrangements of FIGS. 11A-11D could be utilized.

Figure 6B:
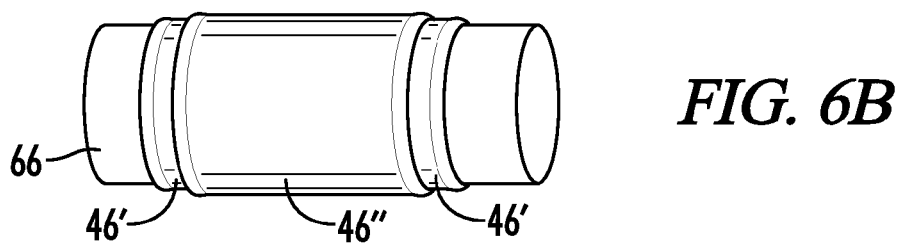

In FIG. 6B the two folded body ply sheets are shown having been wrapped around the tire building drum 66.

Figure 6C:
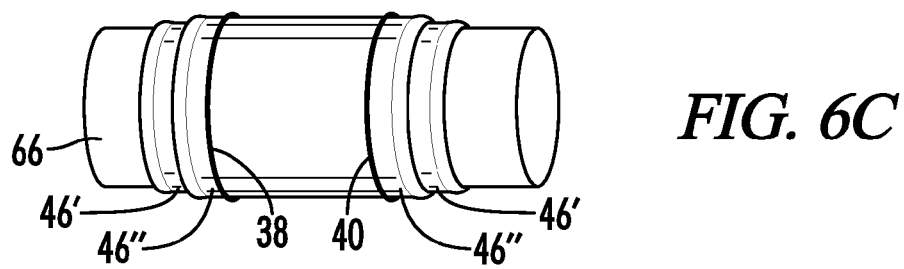

In FIG. 6C the first and second beads 38 and 40 have been placed on the drum.

Figure 6D:
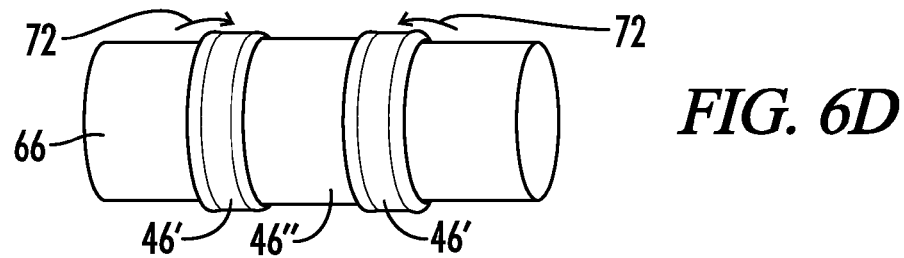

In FIG. 6D the axially outer portions of the two folded body ply sheets have been further folded axially inward as indicated by arrows 72.

Figure 6E:
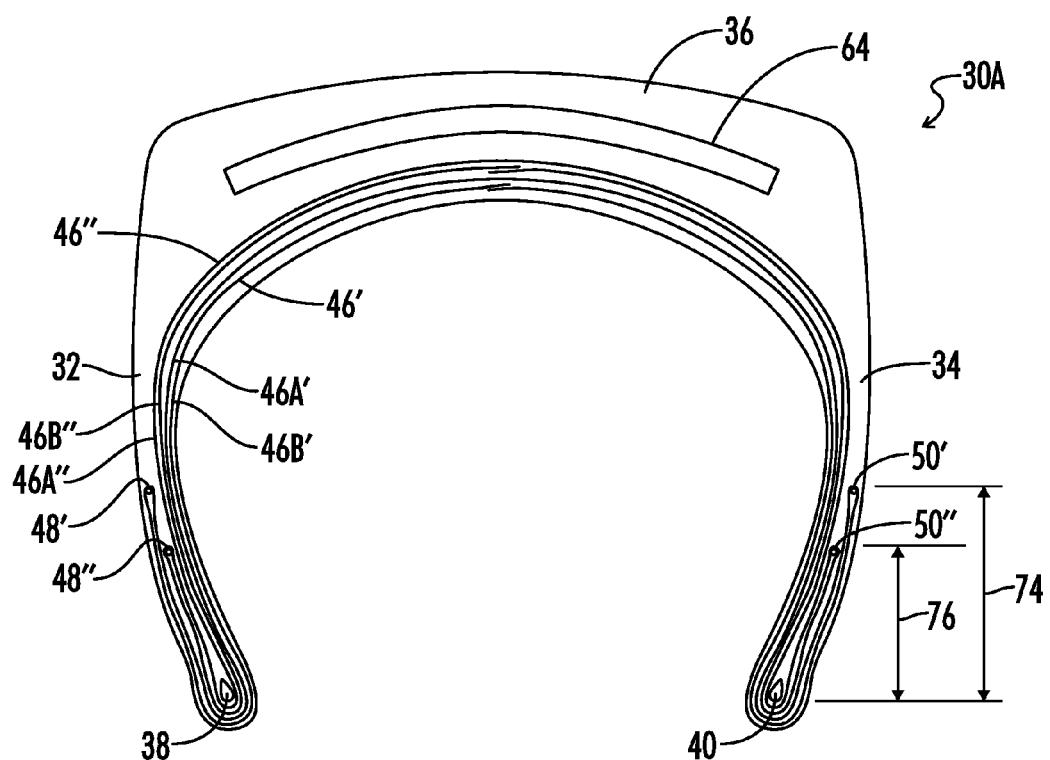

FIG. 6E is a schematic cross-section view of a tire which has been formed from the tire carcass assembled as shown in FIGS. 6A-6D. The tire of FIG. 6E is generally designated as 30A. It includes tread area 36, sidewalls 32 and 34, beads 38 and 40, all generally as described above with regard to the tire 30 of FIG. 2E.

It is seen that the lower folded body ply sheet 46' forms first and second body plies 46B' and 46A' in each sidewall. The upper folded body ply sheet 46" forms third and fourth body plies 46B" and 46A" in each of the sidewalls. Also, because the lower folded body ply sheet 46' is wider than the upper folded body ply sheet 46", the lower folded body ply sheet forms axially outer looped turn-ups 48' and 50' which extend to a higher turn-up height 74 than do the axially inner looped turn-ups 48" and 50" which extend to a shorter turn-up height 76.

Figure 8:
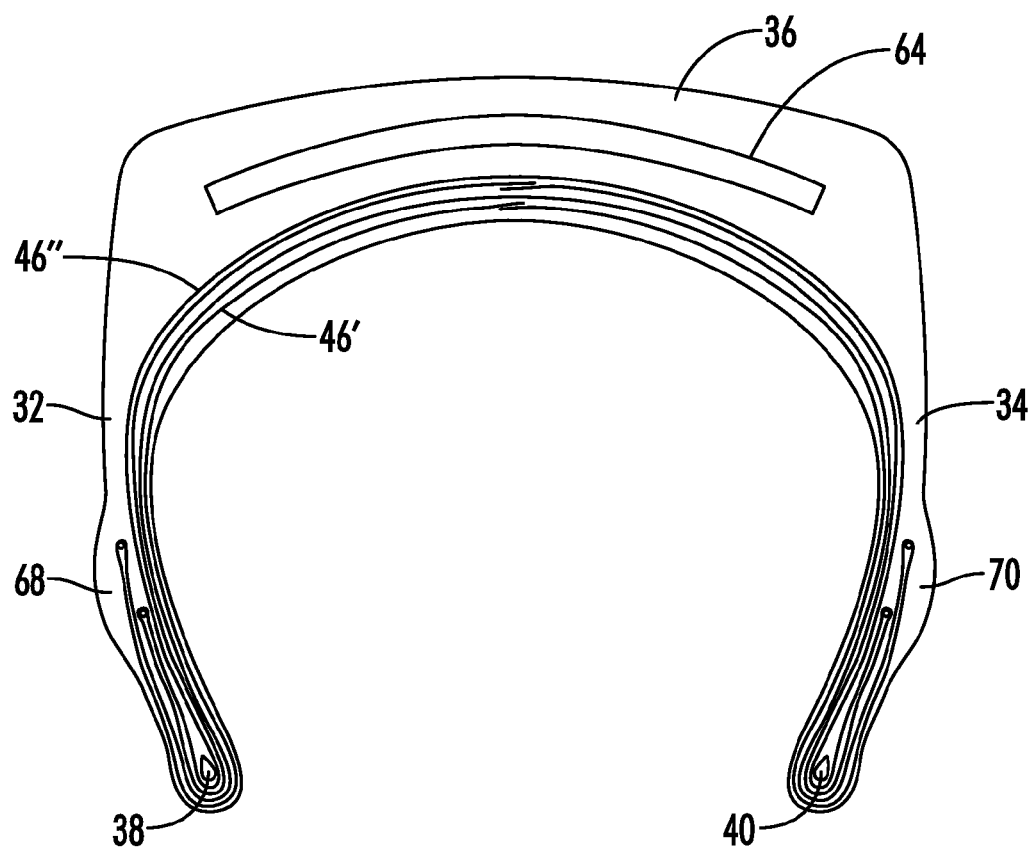
FIG. 8 is a schematic cross-section view of a tire construction similar to FIG. 6E, which in this case has utilized a tire mold which provides an increased sidewall thickness adjacent the looped turn-ups.

FIG. 8 is a schematic cross-section similar to FIG. 6A showing the inclusion of zones of increased sidewall thickness 68 and 70 adjacent the looped turn-ups. The zones 68 and 70 provide additional room for the thickness of the looped turn-ups and the inserts 56 and 58 received in the looped turn-ups.

The Embodiment of FIGS. 7A-7E

Turning now to FIGS. 7A-7E, another alternative embodiment is illustrated which utilizes two folded body ply sheets of equal width.

Figure 7A:
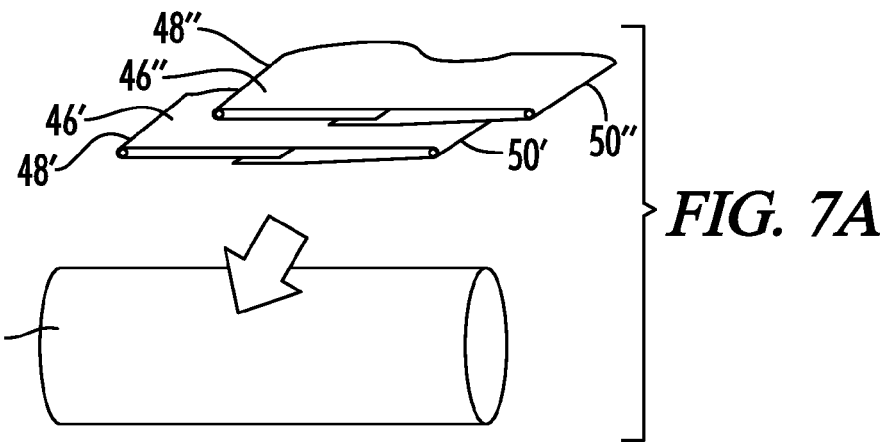
FIGS. 7A-7E are a schematic series of figures similar to FIGS. 6A-6E, but in this case upper and lower folded body ply sheets of equal width are applied to the tire building drum.

FIG. 7A once again shows the two folded body ply sheets 46' and 46" advancing toward the tire building drum 66. It is noted that the upper folded body ply sheet 46" is staggered or offset to the right as seen in FIG. 7A relative to the lower body ply sheet 46'.

Figure 7B:
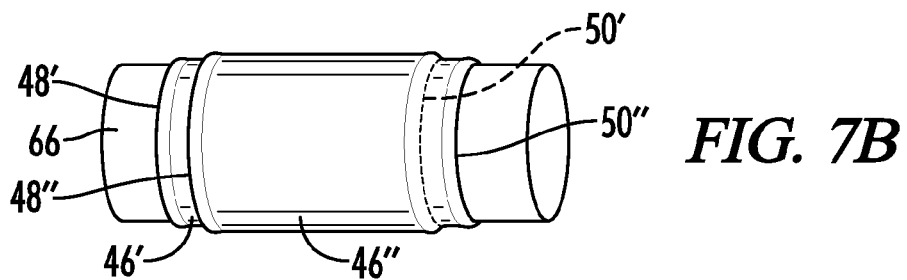

FIG. 7B shows the two folded body ply sheets wrapped around the tire building drum. It is noted that the offset orientation is indicated in part by the showing in dashed lines of the location of that portion of the lower folded body ply sheet 46' which will make up the looped turn-up 50'.

Figure 7C:
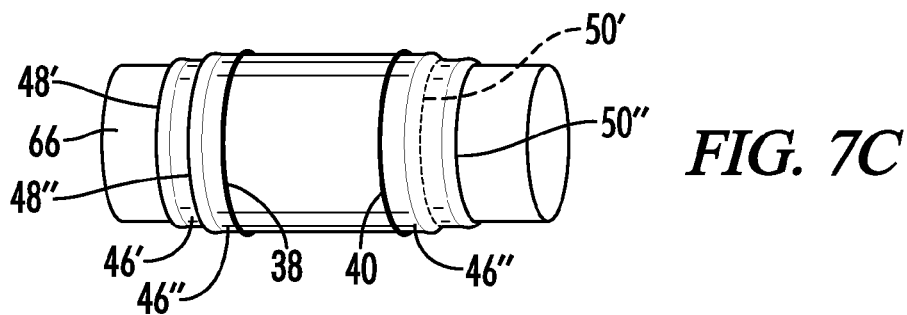

In FIG. 7C the beads 38 and 40 have been placed around the drum.

Figure 7D:
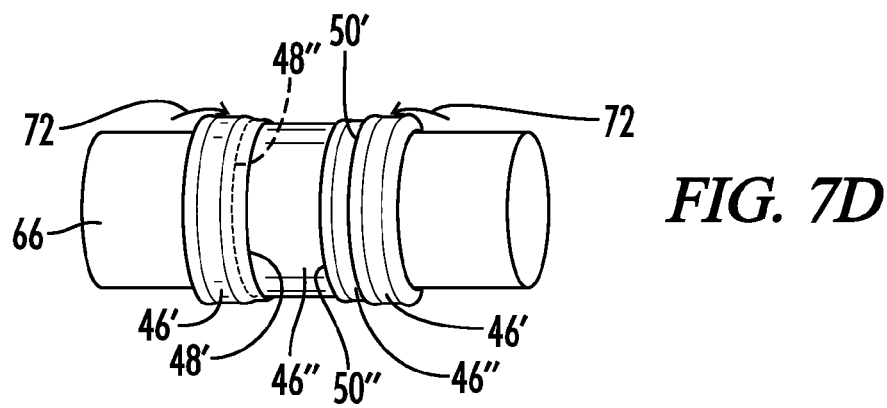

In FIG. 7D the axially outermost portions of the tire carcass have been folded over as indicated by arrows 72.

Figure 7E:
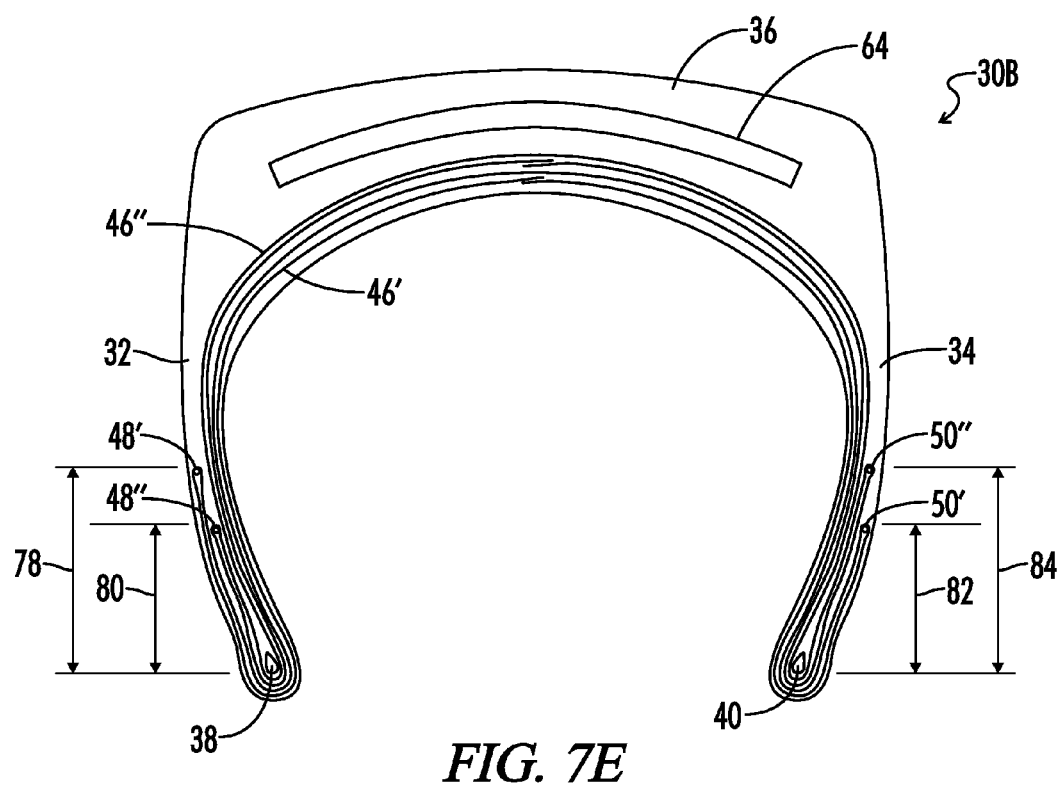

FIG. 7E is a schematic cross-section view of a tire having been formed utilizing the tire carcass created via the sequence of FIGS. 7A-7D. The tire of FIG. 7E is generally designated by the numeral 30B.

It is noted that in the embodiment of FIG. 7E, in the first sidewall 32, the axially outer looped turn-up 48' formed by the lower folded body ply sheet 46' extends to a greater turn-up height 78 than does the axially inner looped turn up 48" formed by the upper body ply sheet 46" which extends to a shorter turn-up height 80.

Conversely, in the second sidewall 34, the axially outer looped turn-up 50' formed by the lower folded body ply sheet 46' extends to a lesser turn-up height 82 than does the axially inner looped turn-up 50" formed by the upper folded body ply sheet 46", which extends to a greater turn-up height 84.

Thus with the arrangement shown in FIGS. 7A-7E, utilizing two folded body ply sheets of equal width, the relationship of the staggered location of the looped turn-ups is reversed in the two sidewalls. This arrangement has the advantage of requiring only one width of folded body ply sheet material to be stocked, whereas the embodiment of FIGS. 6A-6B, requires the use of folded body ply sheets of two different widths.

Figure 13:
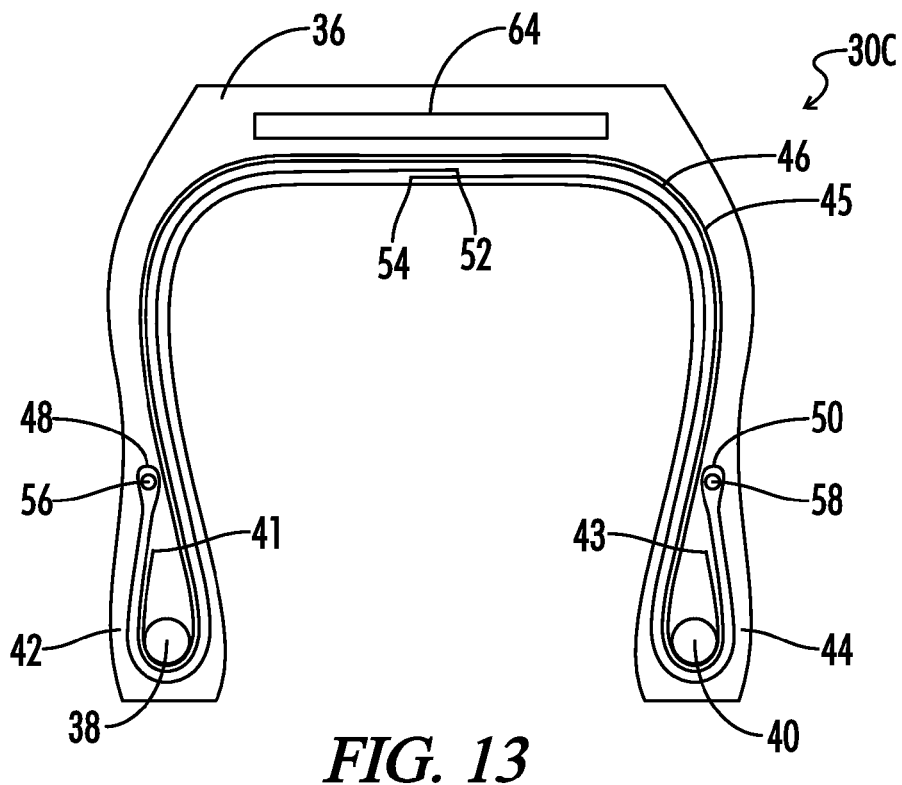
FIG. 13 is a schematic cross-section view of a tire formed from a lower folded body ply sheet and an upper single layer non-folded body ply sheet, such that there are three body plies in each sidewall and there is one looped turn-up and one free turn-up in each sidewall.
Figure 14:
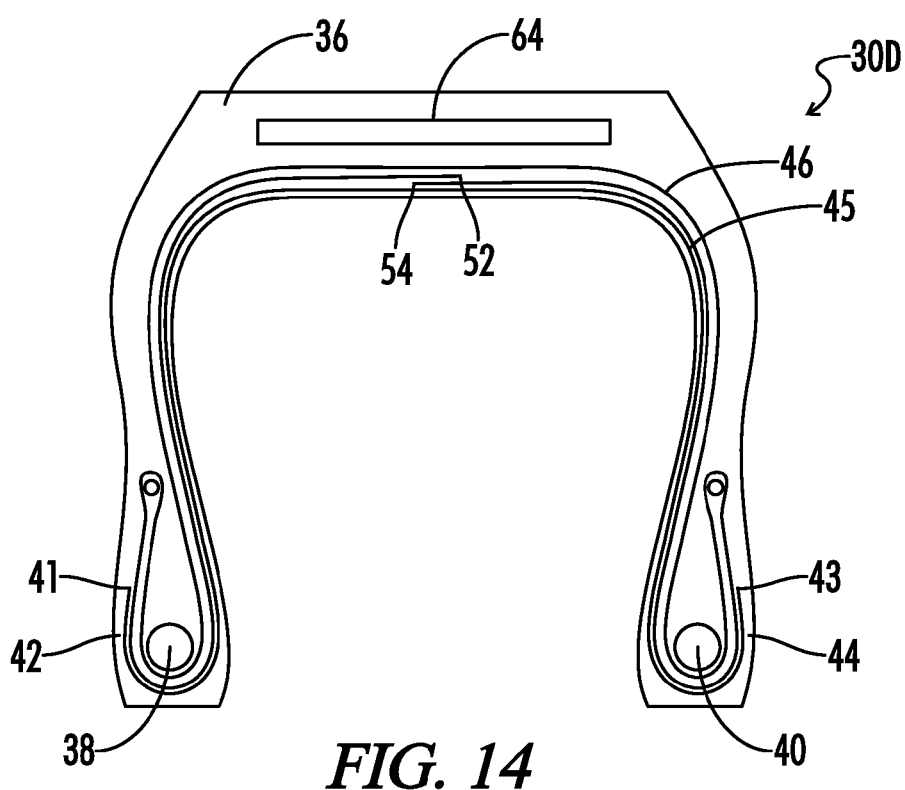
FIG. 14 is a schematic cross-section view of a tire built from an upper folded body ply sheet and a lower single layer non-folded body ply sheet, such that there are three body plies in each sidewall and there is one looped turn-up and one free turn-up in each sidewall.

The Embodiments of FIGS. 13 and 14

It is also possible to combine one or more of the folded body ply sheets with one or more single layer non-folded body ply sheets. While the single layer non-folded body ply sheet will result in a free turn-up end in each sidewall, this is still an improvement as it reduces the number of free turn-up ends as compared to using all single layer non-folded body ply sheets. For example, FIG. 13 shows a tire 30C having a wider lower folded body ply sheet 46 and a narrower upper single layer non-folded body ply sheet 45. The single layer non-folded body ply sheet 45 has free turn-up ends 41 and 43. This tire construction has three body plies in each sidewall.

Similarly, FIG. 14 shows a tire 30D having a wider upper folded body ply sheet 46 and a narrower lower single layer non-folded body ply sheet 45. The single layer non-folded body ply sheet 45 has free turn-up ends 41 and 43.

The single layer non-folded body ply sheets of FIGS. 13 and 14 could also be made wider than the folded body ply sheets or of equal width to the folded body ply sheets. In the case of equal width sheets the sheets could be axially staggered in a manner similar to that shown in FIG. 7A.

Figure 15:
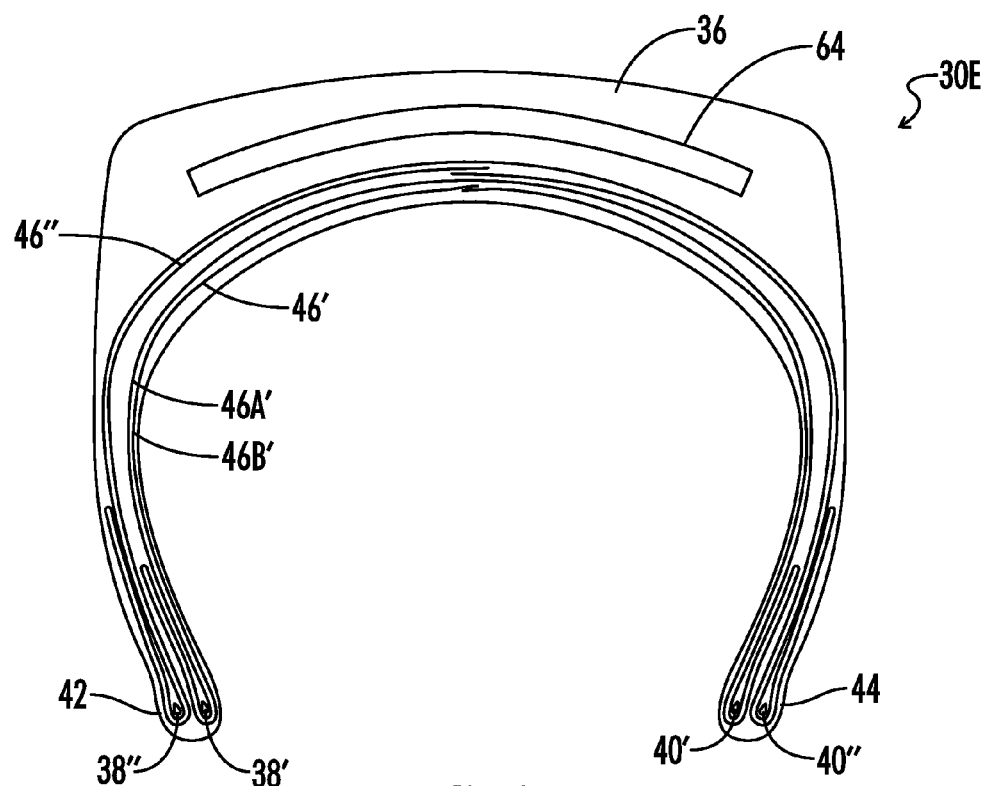
FIG. 15 is a schematic cross-section view of a tire built from the two folded body ply sheets, but in this embodiment there are two beads in each sidewall bead portion and the two folded body ply sheets are wrapped around different beads.

The Embodiment of FIG. 15

The embodiments shown above each use one bead in each sidewall bead portion. It is also possible to use multiple beads in each sidewall bead portion. This may be desirable when the combined thickness of the body plies makes it difficult to fold all of the body plies together around one bead.

FIG. 15 illustrates a tire construction having two folded body ply sheets, but with each folded body ply sheet being wrapped around a separate bead in the bead area. Thus in FIG. 15 a tire 30E has lower folded body ply sheet 46' and upper folded body ply sheet 46". Each of the sidewall bead portions 42 and 44 includes two beads. First sidewall bead portion 42 includes beads 38' and 38". Second sidewall bead portion 44 includes beads 40' and 40". Lower folded body ply sheet 46' wraps around beads 38' and 40'. Upper folded body ply sheet 46" wraps around beads 38" and 40".

It is noted that in any of the embodiments described above more than two folded body ply sheets may be included. Such might be needed for example in a tire designed for extremely high loads, such as an off road mining tire. For example, if six body plies are needed in each sidewall, three folded body ply sheets may be used. If eight body plies are needed in each sidewall, then four folded body ply sheets may be used, and so on. These very large heavy duty tires may be particularly suited for the use of multiple beads as shown in FIG. 15. More than two beads may be used in each sidewall bead portion.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art which changes are encompassed within the scope and spirit of the present invention as defined by the appended claims.

What is claimed is:

1. A pneumatic tire, comprising:
   first and second sidewalls each having a bead portion;
   a circumferential tread area extending between the sidewalls;
   first and second beads located in the bead portions of the first and second sidewalls, respectively;
   a first folded body ply sheet including two layers, the folded body ply sheet extending across the tread area, down through each sidewall such that the folded body ply sheet forms two body plies in each sidewall, around each of the beads, then back upward into each sidewall to form first and second looped turn-ups in the first and second sidewalls, respectively, such that there are no free turn-up ends of the first folded body ply sheet in the sidewalls; and
   first and second inserts received in the looped turn-ups in the first and second sidewalls, respectively, such that a minimum loop radius greater than one-half of a thickness of one layer of the folded body ply sheet is maintained.

2. The tire of claim 1, wherein:
   the body ply sheet is constructed of a body ply skim material having reinforcing cords embedded in the skim material; and
   the inserts are formed of the same material as the body ply skim material.

3. The tire of claim 1, wherein:
   the inserts are at least partially cured prior to placement in the looped turn-ups.

4. The tire of claim 1, wherein:
   the body ply sheet is constructed of a body ply skim material having reinforcing cords embedded in the skim material; and
   the inserts are formed of an elastomeric material different from the skim material.

5. The tire of claim 1, wherein:
   the inserts have a circular cross-section.

6. The tire of claim 1, wherein:
   the inserts have a tapered cross-section.

7. The tire of claim 1, wherein:
   the minimum loop radius is greater than or equal to the thickness of one layer of the folded body ply sheet.

8. The tire of claim 1, wherein:
   each of the sidewalls is formed with an increased sidewall thickness adjacent the looped turn-ups, as compared to the sidewall thickness above and below the looped turn-ups.

9. The tire of claim 1, further comprising:
   a radially outer second folded body ply sheet forming two additional body plies in each sidewall axially outward of the first two body plies of each sidewall, and forming two additional looped turn-ups in the two sidewalls.

10. The tire of claim 9, wherein:
the additional looped turn-ups extend to a lower turn-up height than the first and second looped turn-ups.

11. The tire of claim 10, wherein:
the radially outer second folded body ply sheet has a width less than a width of the first folded body ply sheet prior to application of the folded body ply sheets to the tire.

12. The tire of claim 9, wherein:
in the first sidewall the first looped turn-up extends to a higher turn-up height than the additional looped turn-up of the first sidewall; and
in the second sidewall the second looped turn-up extends to a lower turn-up height than the additional looped turn-up of the second sidewall.

13. The tire of claim 12, wherein:
the folded body ply sheets are of equal width prior to application to the tire.

14. The tire of claim 9, wherein:
the second folded body ply sheet extends around the first and second beads.

15. The tire of claim 9, further comprising:
third and fourth beads located in the bead portions of the first and second sidewalls, respectively; and
wherein the second folded body ply sheet extends around the third and fourth beads but not around the first and second beads.

16. The tire of claim 1, further comprising:
a single layer non-folded body ply sheet forming one additional body ply in each sidewall and forming a free turn-up end in each of the sidewalls.

17. A pneumatic tire, comprising:
first and second sidewalls including first and second sidewall bead portions, respectively;
a circumferential tread area extending between the sidewalls;
a lower folded body ply sheet extending across the tread area, down through each sidewall, then turning upward in each of the bead portions, then extending upward into each sidewall, such that the lower folded body ply sheet forms two axially inner body plies in each sidewall, and such that the lower folded body ply sheet forms a looped turn-up in each sidewall;
an upper folded body ply sheet extending across the tread area, down through each sidewall, then turning upward in each of the bead portions, then extending upward into each sidewall, such that the upper folded body ply sheet forms two axially outer body plies in each sidewall, and such that the upper folded body ply sheet forms another looped turn-up in each sidewall; and
an insert received in each of the looped turn-ups, the insert being sized to maintain a minimum loop radius greater than one-half of a thickness of one layer of the respective folded body ply sheet.

18. The tire of claim 17, further comprising:
first and second beads located in the first and second sidewall bead portions, respectively;
wherein both the lower and upper folded body ply sheets each extend around the first and second beads; and
wherein the looped turn-ups of the lower folded body ply sheet are located axially outward of the looped turn-ups of the upper folded body ply sheet.

19. The tire of claim 18, wherein:
the axially outer looped turn-ups of the lower folded body ply sheet extend to a higher turn-up height than the looped turn-ups of the upper folded body ply sheet.

20. The tire of claim 19, wherein:
the upper folded body ply sheet has a width less than a width of the lower folded body ply sheet prior to application of the folded body ply sheets to the tire.

21. The tire of claim 17, wherein:
the sidewalls each include a zone of increased sidewall thickness adjacent the looped turn-ups.

22. The tire of claim 17, wherein:
each body ply sheet is constructed of a body ply skim material having reinforcing cords embedded in the skim material; and
the inserts are formed of the same material as the body ply skim material.

23. The tire of claim 17, wherein:
the inserts are at least partially cured prior to placement in the looped turn-ups.

24. The tire of claim 17, wherein:
each body ply sheet is constructed of a body ply skim material having reinforcing cords embedded in the skim material; and
the inserts are formed of an elastomeric material different from the skim material.

25. The tire of claim 17, wherein:
the inserts have a circular cross-section.

26. The tire of claim 17, wherein:
the inserts have a tapered cross-section.

27. The tire of claim 17, wherein:
each minimum loop radius is greater than or equal to the thickness of one layer of the respective folded body ply sheet.

28. A pneumatic tire, comprising:
first and second sidewalls including first and second sidewall bead portions, respectively;
a circumferential tread area extending between the sidewalls;
a lower folded body ply sheet extending across the tread area, down through each sidewall, then turning upward in each of the bead portions, then extending upward into each sidewall, such that the lower folded body ply sheet forms two axially inner body plies in each sidewall, and such that the lower folded body ply sheet forms a looped turn-up in each sidewall;
an upper folded body ply sheet extending across the tread area, down through each sidewall, then turning upward in each of the bead portions, then extending upward into each sidewall, such that the upper folded body ply sheet forms two axially outer body plies in each sidewall, and such that the upper folded body ply sheet forms another looped turn-up in each sidewall;
first and second beads located in the first and second sidewall bead portions, respectively;
wherein both the lower and upper folded body ply sheets each extend around the first and second beads;
wherein the looped turn-ups of the lower folded body ply sheet are located axially outward of the looped turn-ups of the upper folded body ply sheet;
wherein in the first sidewall the axially outer looped turn-up of the lower folded body ply sheet extends to a higher turn-up height than the looped turn-up of the upper folded body ply sheet; and
wherein in the second sidewall the axially outer looped turn-up of the lower folded body ply sheet extends to a lower turn-up height than the looped turn-up of the upper folded body ply sheet.

29. The tire of claim 28, wherein:
the upper and lower folded body ply sheets are of equal width prior to application to the tire.

30. A pneumatic tire, comprising:

first and second sidewalls including first and second sidewall bead portions, respectively;

a circumferential tread area extending between the sidewalls;

a lower folded body ply sheet extending across the tread area, down through each sidewall, then turning upward in each of the bead portions, then extending upward into each sidewall, such that the lower folded body ply sheet forms two axially inner body plies in each sidewall, and such that the lower folded body ply sheet forms a looped turn-up in each sidewall;

an upper folded body ply sheet extending across the tread area, down through each sidewall, then turning upward in each of the bead portions, then extending upward into each sidewall, such that the upper folded body ply sheet forms two axially outer body plies in each sidewall, and such that the upper folded body ply sheet forms another looped turn-up in each sidewall;

a first pair of beads located in the first sidewall bead portion;

a second pair of beads located in the second sidewall bead portion; and wherein each of the upper and lower folded body ply sheets extends around different ones of the beads of each sidewall bead portion.

* * * * *